US009623614B2

(12) United States Patent
Holland et al.

(10) Patent No.: US 9,623,614 B2
(45) Date of Patent: Apr. 18, 2017

(54) METHOD FOR MAKING CONTACT LENSES

(75) Inventors: Troy Vernon Holland, Suwanee, GA (US); Dawn Alison Smith, Rotorua (NZ)

(73) Assignee: Novartis AG, Basel (CH)

( * ) Notice: Subject to any disclaimer, the term of this patent is extended or adjusted under 35 U.S.C. 154(b) by 1002 days.

(21) Appl. No.: 13/291,503

(22) Filed: Nov. 8, 2011

(65) Prior Publication Data
US 2012/0112373 A1 May 10, 2012

Related U.S. Application Data

(60) Provisional application No. 61/412,104, filed on Nov. 10, 2010.

(51) Int. Cl.
B29D 11/00 (2006.01)
C08L 39/00 (2006.01)
C08L 39/04 (2006.01)
G02B 1/04 (2006.01)

(52) U.S. Cl.
CPC ........ B29D 11/00192 (2013.01); C08L 39/04 (2013.01); G02B 1/043 (2013.01)

(58) Field of Classification Search
CPC .... B29D 11/00192; G02B 1/043; C08L 39/04
USPC ................ 264/1.1, 1.36, 1.38, 2.5; 523/106; 425/808
See application file for complete search history.

(56) References Cited

U.S. PATENT DOCUMENTS

| 2,542,286 | A | 2/1951 | Morris |
| 3,171,869 | A | 3/1965 | Weinberg |
| 3,944,637 | A | 3/1976 | Bond |
| 4,155,962 | A | 5/1979 | Neefe |
| 4,159,292 | A | 6/1979 | Neefe |
| 4,312,575 | A | 1/1982 | Peyman |
| 4,347,198 | A | 8/1982 | Ohkada |
| 4,444,711 | A | 4/1984 | Schad |
| 4,460,534 | A | 7/1984 | Boehm |
| 4,478,770 | A | 10/1984 | Vofsi |
| 4,534,916 | A | 8/1985 | Wichterle |
| 4,555,549 | A | 11/1985 | Camp |
| 4,596,858 | A | 6/1986 | Gregor |
| 4,632,844 | A | 12/1986 | Yanagihara |
| 4,656,199 | A | 4/1987 | Niederdellmann |
| 4,665,145 | A | 5/1987 | Yokota |
| 4,709,066 | A | 11/1987 | Chapman |
| 4,782,946 | A | 11/1988 | Pollak |
| 4,812,173 | A | 3/1989 | Tsao |
| 4,824,922 | A | 4/1989 | Chapman |
| 4,889,664 | A | 12/1989 | Kindt-Larsen |
| 4,929,707 | A | 5/1990 | Nagata |
| 4,946,923 | A | 8/1990 | Nagata |
| 4,975,328 | A | 12/1990 | Hirose |
| 4,983,332 | A | 1/1991 | Hahn |
| 5,013,496 | A | 5/1991 | Nagata |
| 5,021,503 | A | 6/1991 | Nagata |
| 5,032,658 | A | 7/1991 | Baron |
| 5,039,459 | A | 8/1991 | Kindt-Larsen |
| 5,080,839 | A | 1/1992 | Kindt-Larsen |
| 5,084,545 | A | 1/1992 | Nagata |
| 5,126,388 | A | 6/1992 | Nagata |
| 5,135,297 | A | 8/1992 | Valint, Jr. |
| 5,177,165 | A | 1/1993 | Valint, Jr. |
| 5,177,168 | A | 1/1993 | Baron |
| 5,196,492 | A | 3/1993 | Renzi |
| 5,219,965 | A | 6/1993 | Valint, Jr. |
| 5,264,161 | A | 11/1993 | Druskis |
| 5,346,978 | A | 9/1994 | Baron |
| 5,364,918 | A | 11/1994 | Valint, Jr. |
| 5,374,668 | A | 12/1994 | Kanemura |
| 5,476,111 | A | 12/1995 | Anderson |
| 5,508,317 | A | 4/1996 | Müller |
| 5,525,691 | A | 6/1996 | Valint, Jr. |
| 5,527,925 | A | 6/1996 | Chabrecek |
| 5,540,410 | A | 7/1996 | Lust |
| 5,542,978 | A | 8/1996 | Kindt-Larsen |
| 5,545,366 | A | 8/1996 | Lust |
| 5,555,504 | A | 9/1996 | Lepper |
| 5,583,163 | A | 12/1996 | Müller |
| 5,594,088 | A | 1/1997 | Nagata |
| 5,612,389 | A | 3/1997 | Chabrecek |
| 5,612,391 | A | 3/1997 | Chabrecek |
| 5,621,018 | A | 4/1997 | Chabrecek |

(Continued)

FOREIGN PATENT DOCUMENTS

| EP | 0329386 A2 | 8/1989 |
| EP | 329388 A2 | 8/1989 |
| EP | 0367513 A2 | 5/1990 |
| EP | 0420403 A1 | 4/1991 |
| EP | 0486294 A2 | 5/1992 |
| EP | 0995792 A1 | 4/2000 |
| EP | 0958315 B1 | 6/2001 |
| EP | 0932635 B1 | 7/2001 |

(Continued)

OTHER PUBLICATIONS

PCT International Search Report dated Jan. 20, 2012, International Application No. PCT/US2011-059718, International Filing Date Nov. 8, 2011.
PCT Written Opinion of the International Searching Authority dated Jan. 20, 2012, International Application No. PCT/US2011-059718, International Filing Date Nov. 8, 2011.
Authors: Matthias Fuchs and Kenneth S. Schweizer, Title of Article: Polymer-Mode-Coupling Theory of Finite-Size-Fluctuation Effects in Entangled Solutions, Melts, and Gels. 2. Comparison with Experiment, Published: Macromolecules 1997, vol. 30, No. 17, pp. 5156-5171.
Authors: Hary Razafindralambo, Philippe Thonart, and Michel Paquot, Title of Article: Dynamic and Equilibrium Surface Tensions of Surfactin Aqueous Solutions, Published: Journal of Surfactants and Detergents, vol. 7, No. 1, Jan. 2004, pp. 41-46.

Primary Examiner — Mathieu Vargot
(74) Attorney, Agent, or Firm — Sheng-Hsin Hu

(57) ABSTRACT

The instant invention pertains to a method and a fluid composition for producing contact lenses with improved lens quality and with increased product yield. The method of the invention involves adding a Butylated Polyvinylpyrrolidone into a fluid composition including a lens-forming material in an amount sufficient to reduce an averaged mold separation force by at least about 20% in comparison with that without the Butylated Polyvinylpyrrolidone.

5 Claims, No Drawings

(56) References Cited

U.S. PATENT DOCUMENTS

| | | |
|---|---|---|
| 5,639,510 A | 6/1997 | Kindt-Larsen |
| 5,640,980 A | 6/1997 | Keene |
| 5,656,208 A | 8/1997 | Martin |
| 5,656,210 A | 8/1997 | Hill |
| 5,658,602 A | 8/1997 | Martin |
| 5,665,840 A | 9/1997 | Pöhlmann |
| 5,674,557 A | 10/1997 | Widman |
| 5,690,865 A | 11/1997 | Kindt-Larsen |
| 5,690,866 A | 11/1997 | Andersen |
| 5,690,973 A | 11/1997 | Kindt-Larsen |
| 5,693,268 A | 12/1997 | Widman |
| 5,702,735 A | 12/1997 | Martin |
| 5,712,356 A | 1/1998 | Bothe |
| 5,744,357 A | 4/1998 | Wang |
| 5,753,150 A | 5/1998 | Martin |
| 5,753,730 A | 5/1998 | Nagata |
| 5,762,081 A | 6/1998 | Keene |
| 5,789,464 A | 8/1998 | Müller |
| 5,804,107 A | 9/1998 | Martin |
| 5,807,585 A | 9/1998 | Martin |
| 5,815,238 A | 9/1998 | Beaton |
| 5,820,895 A | 10/1998 | Widman |
| 5,836,323 A | 11/1998 | Keene |
| 5,837,314 A | 11/1998 | Beaton |
| 5,843,346 A | 12/1998 | Morrill |
| 5,844,802 A | 12/1998 | Lepper |
| 5,849,209 A | 12/1998 | Kindt-Larsen |
| 5,849,222 A | 12/1998 | Jen |
| 5,849,810 A | 12/1998 | Müller |
| 5,849,841 A | 12/1998 | Mühlebach |
| 5,850,107 A | 12/1998 | Kindt-Larsen |
| 5,861,114 A | 1/1999 | Roffman |
| 5,894,002 A | 4/1999 | Boneberger |
| 5,914,074 A | 6/1999 | Martin |
| 5,916,494 A | 6/1999 | Widman |
| 5,935,492 A | 8/1999 | Martin |
| 5,936,052 A | 8/1999 | Bothe |
| 5,965,172 A | 10/1999 | Wang |
| 5,975,875 A | 11/1999 | Crowe, Jr. |
| 5,981,618 A | 11/1999 | Martin |
| 6,008,281 A | 12/1999 | Yang |
| 6,012,471 A | 1/2000 | Calvin |
| 6,039,899 A | 3/2000 | Martin |
| 6,071,112 A | 6/2000 | Calvin |
| 6,071,440 A | 6/2000 | Wang |
| 6,149,842 A | 11/2000 | Lally |
| 6,165,408 A | 12/2000 | Steinmann |
| 6,203,909 B1 | 3/2001 | Chassot |
| 6,220,845 B1 | 4/2001 | Martin |
| 6,221,303 B1 | 4/2001 | Steinmann |
| 6,284,161 B1 | 9/2001 | Thakrar |
| 6,303,687 B1 | 10/2001 | Müller |
| 6,331,578 B1 | 12/2001 | Turner |
| 6,337,040 B1 | 1/2002 | Thakrar |
| 6,342,570 B1 | 1/2002 | Bothe |
| 6,367,929 B1 | 4/2002 | Maiden |
| 6,428,839 B1 | 8/2002 | Künzler |
| 6,431,706 B1 | 8/2002 | Dean |
| 6,451,871 B1 | 9/2002 | Winterton |
| 6,472,489 B1 | 10/2002 | Stockinger |
| 6,479,587 B1 | 11/2002 | Stockinger |
| 6,492,478 B1 | 12/2002 | Steinmann |
| 6,511,617 B1 | 1/2003 | Martin |
| 6,531,432 B2 | 3/2003 | Molock |
| 6,551,531 B1 | 4/2003 | Ford |
| 6,592,356 B1 | 7/2003 | Lust |
| 6,627,124 B1 | 9/2003 | Herbrechtsmeier |
| 6,699,435 B2 | 3/2004 | Salpekar |
| 6,719,929 B2 | 4/2004 | Winterton |
| 6,793,973 B2 | 9/2004 | Winterton |
| 6,800,225 B1 | 10/2004 | Hagmann |
| 6,849,210 B2 | 2/2005 | Bothe |
| 6,926,965 B2 | 8/2005 | Qiu |
| 7,384,590 B2 | 6/2008 | Kelly |
| 7,387,759 B2 | 6/2008 | Kelly |
| 2001/0036556 A1 | 11/2001 | Jen |
| 2003/0052424 A1 | 3/2003 | Turner |
| 2003/0119943 A1 | 6/2003 | Tucker |
| 2003/0125498 A1 | 7/2003 | McCabe |
| 2003/0162862 A1 | 8/2003 | McCabe |
| 2003/0209818 A1 | 11/2003 | Bothe |
| 2004/0046287 A1 | 3/2004 | Andino |
| 2004/0082680 A1 | 4/2004 | Phelan |
| 2005/0113549 A1 | 5/2005 | Devlin |
| 2007/0037897 A1 | 2/2007 | Wang |
| 2007/0244211 A1 | 10/2007 | Phelan |

FOREIGN PATENT DOCUMENTS

| | | |
|---|---|---|
| EP | 0961941 B1 | 4/2002 |
| GB | 2064556 A | 6/1981 |
| GB | 2086400 A | 5/1982 |
| WO | 8704390 A1 | 7/1987 |
| WO | 9705190 A1 | 2/1997 |
| WO | 9926087 A1 | 5/1999 |
| WO | 0031150 A1 | 6/2000 |
| WO | 02071106 A1 | 9/2002 |
| WO | 03011551 A1 | 2/2003 |
| WO | 03022322 A2 | 3/2003 |
| WO | 03066714 A1 | 8/2003 |

METHOD FOR MAKING CONTACT LENSES

This application claims the benefit under 35 USC §119 (e) of U.S. provisional application No. 61/412,104 filed Nov. 10, 2010, herein incorporated by reference in its entirety.

The present invention is related to a method for making a contact lens with an enhanced product quality and yield. In particular, the present invention is related to a method for facilitating mold separation and lens removal from a mold in a cast-molding process of contact lenses, thereby enhancing the quality and yield of produced contact lenses.

BACKGROUND

Contact lenses can be manufactured economically in a mass production manner by a conventional cast-molding process involving disposable molds (e.g., PCT published patent application No. WO/87/04390, EP-A 0 367 513, U.S. Pat. No. 5,894,002, all of which are herein incorporated by reference in their entireties) or by an improved cast-molding process involving reusable molds and curing under a spatial limitation of actinic radiation (U.S. Pat. Nos. 5,508,317, 5,583,163, 5,789,464 and 5,849,810). A critical step in the production of lenses using molds is mold opening and lens releasing from the mold without damaging the lens. Subsequent to the completion of the contact lens molding process, the polymerized lens tends to strongly adhere to the mold. During mold opening and removing the contact lenses from the mold, cracks, flaws and/or tears may occur in the lenses or in the worst case the contact lenses even break totally. Contact lenses having such defects have to be discarded and lower the overall production yield.

Several methods have been developed or proposed. One method of lens release is to incorporate surfactants as internal mold releasing agents into molds as illustrated by U.S. Pat. No. 4,159,292. Incorporation of internal mold releasing agents in molds can decrease adhesion between lenses and molds. However, when a mold is used repeatedly, surfactants as internal mold releasing agent can be exhausted by exudation.

Another method of lens release is to apply external mold releasing agents (e.g., surfactants) in the form of a film or coating onto to the molding surfaces of a mold (e.g., those disclosed in U.S. Pat. Nos. 4,929,707 and 5,542,978). When external mold releasing agents are used, a portion of the agents used for treating the molding surfaces of the mold can migrate to the surface and interior of the polymerized lens, which results in problems such as non-uniformity of the surface of the lens and turbidity. When a mold is used repeatedly, mold releasing treatment is required in each molding cycle. Such treatment can lower productivity in producing the lens.

A still further method of lens release is to incorporate internal mold releasing agents into a lens-forming composition for making contact lenses. The internal mold releasing agent can be a surfactant (U.S. Pat. Nos. 4,534,916, 4,929, 707, 4,946,923, 5,013,496, 5,021,503, 5,126,388, 5,594,088, 5,753,730) or a non-polymerizable polymer (U.S. Pat. No. 6,849,210, U.S. Patent Application Publication 2007/0037897). By incorporation of an internal mold releasing agent in a lens-forming composition (or lens formulation), the adhesion between molds and lenses may be reduced, a relatively smaller force may be required to separate mold, and lenses may be removed from molds with less effort. However, for a specific lens material and/or a mold material, not all surfactants or polymers can be effective mold releasing agents for facilitating mold separation and lens removal from a mold, in particular, under conditions of high speed automated operations (i.e., the time interval between dosing a lens-forming material in a mold and curing the lens-forming material in the mold is relatively short, e.g., less than about 20 seconds). Although some mold releasing agents may be able to lower an averaged mold separation force for a given lens-forming material, individual mold separation forces may vary widely and become an uncontrollable factor that affects the product quality and yield. In addition, a non-crosslinkable polymer may be effective in reducing mold separation force but may have adverse effects on the properties of resultant lenses. For example, it may cause resultant lenses to be hazy and affect the refractive index of the resultant lenses. Furthermore, there are few known methods for selecting a non-polymerizable polymer as an effective mold releasing agent for a given lens-forming material.

Therefore, there still a need for a method for selecting an effective mold releasing agent for a given lens-forming material. There is also a need for a process for cast-molding contact lenses with an enhanced quality and enhanced yield achieved by reducing mold separation force and lens-mold adhesion.

SUMMARY OF THE INVENTION

The invention, in one aspect, provides a method for producing a contact lens with relatively high quality and with relatively high yield. The method comprises the steps of: (1) introducing a fluid composition into a mold for making a contact lens, wherein the fluid composition comprises a lens-forming material and Butylated Polyvinylpyrrolidone, wherein the lens-forming material is crosslinkable and/or polymerizable by actinic radiation, wherein the Butylated forms an interfacial film at interface between the mold and the fluid composition therein within a desired time period and with a thickness sufficient to reduce an averaged mold separation force; (2) crosslinking/polymerizing the lens-forming material in the mold to form a lens having a polymer matrix; and (3) separating the mold, wherein the Butylated Polyvinylpyrrolidone is present in an amount sufficient to reduce an averaged mold separation force by at least about 20% in comparison with that without the Butylated Polyvinylpyrrolidone, thereby leading to an increased production yield and an improved lens quality.

DETAILED DESCRIPTION OF THE PREFERRED EMBODIMENTS

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art. As employed throughout the disclosure, the following terms, unless otherwise indicated, shall be understood to have the following meanings.

The term "contact lens" employed herein in a broad sense and is intended to encompass any hard or soft lens used on the eye or ocular vicinity for vision correction, diagnosis, sample collection, drug delivery, wound healing, cosmetic appearance (e.g., eye color modification), or other ophthalmic applications.

A "hydrogel material" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers. Exemplary hydrogels include, but are not limited to, poly (vinyl alcohol) (PVA), modified polyvinylalcohol (e.g., as nelfilcon A), poly (hydroxyethyl methacrylate), poly (vinyl pyrrolidone), PVAs with polycarboxylic acids (e.g., carbopol), polyethylene glycol, polyacrylamide, polymethacrylamide, silicone-containing hydrogels, polyurethanes, polyureas, and the like. A hydrogel can be prepared according to any methods known to a person skilled in the art.

A "HEMA-based hydrogel" refers to a hydrogel obtained by copolymerization of a polymerizable composition comprising hydroxyethylmethacrylate (HEMA).

A "silicone hydrogel" refers to a hydrogel obtained by copolymerization of a polymerizable composition comprising at least one silicone-containing monomer or at least one silicone-containing macromer.

The term "fluid" as used herein indicates that a material is capable of flowing like a liquid.

A "lens-forming material" refers to a material which can be polymerized and/or crosslinked by actinic radiation to form a contact lens.

Actinic radiation refers to radiation of a suitable form of energy. Examples of actinic radiation includes without limitation light radiation (e.g., UV radiation), gamma radiation, electron radiation, X-ray irradiation, microwave irradiation, thermal radiation and the like.

As used herein, a "monomer" or a "vinylic monomer" interchangeably means a low molecular weight compound that can be polymerized actinically or thermally. Typically, a monomer comprises an ethylenically unsaturated group. Low molecular weight typically means average molecular weights less than 700 Daltons.

The term "ethylenically unsaturated group" or "olefinically unsaturated group" is employed herein in a broad sense and is intended to encompass any groups containing at least one >C=C< group. Exemplary ethylenically unsaturated groups include without limitation acryloyl, methacryloyl, allyl, vinyl, styrenyl, or other C=C containing groups.

A "hydrophilic monomer" refers to a monomer which can be polymerized to form a homopolymer which can absorb at least 10 percent by weight of water when fully hydrated.

As used herein, a "macromer" means a medium and high molecular weight compound or polymer that contains ethylenically unsaturated group(s) capable of being polymerized actinically or thermally. Medium and high molecular weight typically means average molecular weights greater than 700 Daltons.

"Molecular weight" of a polymeric material (including monomeric or macromeric materials), as used herein, refers to the number-average molecular weight unless otherwise specifically noted or unless testing conditions indicate otherwise.

A "polymer" means a material formed by polymerizing one or more monomers.

A "prepolymer" refers to a starting polymer which can be polymerized and/or crosslinked upon actinic radiation to obtain a crosslinked polymer having a molecular weight much higher than the starting polymer.

A "photoinitiator" refers to a substance that can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and DAROCUR® and IRGACURE® types, preferably DAROCUR® 1173 and IRGACURE®2959. Examples of benzoylphosphine initiators include 2,4,6-trimethylbenzoyldiphenylo-phosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

A "visibility tinting agent" refers to a substance that dyes (or colors) a contact lens to enable a user to easily locate a contact lens in a clear solution within a lens storage, disinfecting or cleaning container. It is well known in the art that a dye and/or a pigment can be used as a visibility tinting agent.

A "dye" means a substance that is soluble in a solvent and that is used to impart color. Dyes are typically translucent and absorb but do not scatter light. Any suitable biocompatible dye can be used in the present invention.

A "Pigment" means a powdered substance that is suspended in a liquid in which it is insoluble. A pigment can be a fluorescent pigment, phosphorescent pigment, pearlescent pigment, or conventional pigment. While any suitable pigment may be employed, it is presently preferred that the pigment is heat resistant, non-toxic and insoluble in aqueous solutions. Examples of preferred pigments include (C.I. is the color index no.), without limitation, for a blue color, phthalocyanine blue (pigment blue 15:3, C.I. 74160), cobalt blue (pigment blue 36, C.I. 77343), TONER cyan BG (Clariant), PERMAJET® t blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, MONOLITH black C-K (CIBA Specialty Chemicals).

A "spatial limitation of actinic radiation" refers to an act or process in which energy radiation in the form of rays is directed by means of, for example, a mask or screen or combinations thereof, to impinge, in a spatially restricted manner, onto an area having a well defined peripheral boundary. For example, a spatil limitation of UV radiation can be achieved by using a mask or screen which has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the unmasked region.

The term "mold separation force" as used herein refers to a force required for separating a mold after casting molding a contact lens in the mold. Mold separation force is proportional to adhesion between a mold and a lens cast-molded therein.

An "averaged mold separation force" refers to a value obtained by averaging at least 10 independent measurements of mold separation force (i.e., 10 testing samples).

In general, the invention is directed to a method for reducing adhesion between a mold (or mold half) and a contact lens cast-molded in the mold. In the search for a solution to reduce mold separation force, applicants have surprisingly and unexpectedly identified a release agent, namely Butylated Polyvinylpyrrolidone, which is effectively used as a mold releasing agent in a lens-forming composition including a water-soluble crosslinkable prepolymer as a lens-forming material, its efficiency in reducing averaged mold separation force. It is found that the averaged mold separation force decreases at least 20% in comparison with that without the Butylated Polyvinylpyrrolidone.

Although the inventors do not wish to be bound by any particular theory, it is believed that reduction of mold separation force by the presence of a mold releasing agent is due to an interfacial film formed from a mold releasing agent at the interface between a mold and a lens-forming composition therein. Intactness of this interfacial film may affect the quality of lenses to be produced, since localized lens-to-mold adhesion in defected areas (e.g., holes or broken areas) of the interfacial film can be high enough to cause lens defects such as cracks, flaws and/or tears during mold separation process.

The invention, in one aspect, provides a method for producing a contact lens with relatively high quality and with relatively high yield. The method comprises the steps of: (1) introducing a fluid composition into a mold for making a contact lens, wherein the fluid composition comprises a lens-forming material and a Butylated Polyvinylpyrrolidone, wherein the lens-forming material is crosslinkable and/or polymerizable by actinic radiation; (2) crosslinking/polymerizing the lens-forming material in the mold to form a lens having a polymer matrix; and (3) separating the mold, wherein the Butylated Polyvinylpyrrolidone is present in an amount sufficient to reduce an averaged mold separation force by at least about 20% in comparison with that without the Butylated Polyvinylpyrrolidone.

In accordance with the invention, an increased production yield is intended to describe that the yield of contact lens production is increased by adding a mold releasing agent in a lens-forming composition. An "improved lens quality" is intended to describe that the quality of produced contact lenses is improved in the presence of a mold releasing agent in a lens-forming composition as compared to that in the absence of the mold releasing agent.

In accordance with the present invention, a fluid composition is a solution or a solvent-free liquid or melt at a temperature below about 60° C. A fluid composition can optionally further include various components, such as photoinitiator, visibility tinting agent, fillers, and the like. A fluid composition of the invention can further include other components, such as a photoinitiator, a visibility tinting agent, a filler, an antimicrobial agent, a lubricant, a UV-blocking agent, a photosensitizer, or a mixture thereof.

Any lens-forming materials can be used in the invention. Lens forming materials that are suitable in the fabrication of contact lenses are illustrated by numerous issued US patents and familiar to those skilled in the art. Preferred lens-forming materials are capable of forming hydrogels. A lens-forming material can be a prepolymer, a mixture of prepolymers, a mixture of monomers, or a mixture of one or more prepolymers and one or more monomers and/or macromers. It should be understood that any silicone-containing prepolymers or any silicone-free prepolymers can be used in the present invention.

A solution of a lens-forming material can be prepared by dissolving the lens-forming material in any suitable solvent known to a person skilled in the art. Examples of suitable solvents are water, alcohols, such as lower alkanols (e.g., ethanol, methanol or isopropanol), carboxylic acid amides (e.g., dimethylformamide), dipolar aprotic solvents, such as dimethyl sulfoxide or methyl ethyl ketone, ketones (e.g., acetone or cyclohexanone), hydrocarbons (e.g., toluene, ethers, THF, dimethoxyethane or dioxane), and halogenated hydrocarbons (e.g., trichloroethane), and mixtures of suitable solvents (e.g., mixtures of water with an alcohol, a water/ethanol or a water/methanol mixture).

A preferred group of lens-forming materials are prepolymers which are water-soluble and/or meltable. It would be advantageous that a lens-forming material comprises primarily one or more prepolymers which are preferably in a substantially pure form (e.g., purified by ultrafiltration). Therefore, after crosslinking/polymerizing by actinic radiation, a contact lens may require practically no more subsequent purification, such as complicated extraction of unpolymerized constituents. Furthermore, crosslinking/polymerizing may take place solvent-free or in aqueous solution, so that a subsequent solvent exchange or the hydration step is not necessary.

In accordance with the invention, the criterion that the prepolymer is soluble in water denotes in particular that the prepolymer is soluble in a concentration of approximately from 3 to 90% by weight, preferably approximately from 5 to 60% by weight, especially approximately from 10 to 60% by weight, in a substantially aqueous solution. Insofar as it is possible in an individual case, prepolymer concentrations of more than 90% are also included in accordance with the invention. Especially preferred concentrations of the prepolymer in solution are from approximately 15 to approximately 50% by weight, especially from approximately 15 to approximately 45% by weight, for example from approximately 25% to approximately 45% by weight.

Examples of preferred actinically crosslinkable prepolymers include, but are not limited to, a water-soluble crosslinkable polyurea prepolymer described in U.S. Pat. No. 6,479,587 or in U.S. Patent Application publication No. 2005/0113549 A1 (herein incorporated by reference in their entireties); a water-soluble crosslinkable polyvinyl alcohol) prepolymer described in U.S. Pat. Nos. 5,583,163 and 6,303,687 (incorporated by reference in their entireties); a water-soluble crosslinkable poly(oxyalkylene)-containing polyurethane prepolymer disclosed in U.S. patent application publication No. 2004/0082680 A1 (herein incorporated by reference); a water-soluble crosslinkable poly(oxyalkylene)-containing polyamide prepolymer disclosed in a copending U.S. Patent Application No. 60/630,164 filed Nov. 22, 2004 entitled "Crosslinkable Poly(oxyalkylene)-Containing Polyamide Prepolymers" (herein incorporated by reference in its entirety); derivatives of a polyvinyl alcohol, polyethyleneimine or polyvinylamine, which are disclosed in U.S. Pat. No. 5,849,841 (incorporated by reference in its entirety); crosslinkable polyacrylamide; crosslinkable statistical copolymers of vinyl lactam, MMA and a comonomer, which are disclosed in EP 655,470 and U.S. Pat. No. 5,712,356; crosslinkable copolymers of vinyl lactam, vinyl acetate and vinyl alcohol, which are disclosed in EP 712,867 and U.S. Pat. No. 5,665,840; polyether-polyester copolymers with crosslinkable side chains which are disclosed in EP 932,635 and U.S. Pat. No. 6,492,478; branched polyalkylene glycol-urethane prepolymers disclosed in EP 958,315 and U.S. Pat. No. 6,165,408; polyalkylene glycol-tetra(meth)acrylate prepolymers disclosed in EP 961,941 and U.S. Pat. No. 6,221,303; and crosslinkable polyallylamine gluconolactone prepolymers disclosed in PCT patent application WO 2000/31150 and U.S. Pat. No. 6,472,489.

Preferably, a water-soluble crosslinkable poly(vinyl alcohol) prepolymer is a polyhydroxyl compound which is described in U.S. Pat. Nos. 5,583,163 and 6,303,687 and has a molecular weight of at least about 2000 and which comprises from about 0.5 to about 80%, based on the number of hydroxyl groups in the poly(vinyl alcohol), of units of the formula I, I and II, I and III, or I and II and III

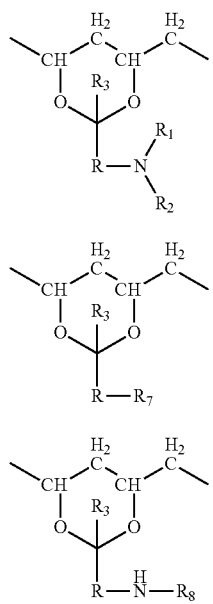

In formula I, II and III, the molecular weight refers to a weight average molecular weight, Mw, determined by gel permeation chromatography.

In formula I, II and II, $R_3$ is hydrogen, a $C_1$-$C_6$ alkyl group or a cycloalkyl group.

In formula I, II and III, R is alkylene having up to 12 carbon atoms, preferably up to 8 carbon atoms, and can be linear or branched. Suitable examples include octylene, hexylene, pentylene, butylene, propylene, ethylene, methylene, 2-propylene, 2-butylene and 3-pentylene. Lower alkylene R preferably has up to 6, particularly preferably up to 4 carbon atoms. Methylene and butylene are particularly preferred.

In the formula I, $R_1$ is hydrogen or lower alkyl having up to seven, in particular up to four, carbon atoms. Most preferably, $R_1$ is hydrogen.

In the formula I, $R_2$ is an olefinically unsaturated, electron-withdrawing, crosslinkable radical, preferably having up to 25 carbon atoms. In one embodiment, $R_2$ is an olefinically unsaturated acyl radical of the formula $R_4$—CO—, in which $R_4$ is an olefinically unsaturated, crosslinkable radical having 2 to 24 carbon atoms, preferably having 2 to 8 carbon atoms, particularly preferably having 2 to 4 carbon atoms.

The olefinically unsaturated, crosslinkable radical $R_4$ having 2 to 24 carbon atoms is preferably alkenyl having 2 to 24 carbon atoms, in particular alkenyl having 2 to 8 carbon atoms, particularly preferably alkenyl having 2 to 4 carbon atoms, for example ethenyl, 2-propenyl, 3-propenyl, 2-butenyl, hexenyl, octenyl or dodecenyl. Ethenyl and 2-propenyl are preferred, so that the —CO—$R_4$ group is the acyl radical of acrylic acid or methacrylic acid.

A water-soluble crosslinkable poly(vinyl alcohol) according to the invention is more preferably a polyhydroxyl compound which has a molecular weight of at least about 2000 and which comprises from about 0.5 to about 80%, preferably from 1 to 50%, more preferably from 1 to 25%, even more preferably from 2 to 15%, based on the number of hydroxyl groups in the poly(vinyl alcohol), of units of the formula I, wherein R is lower alkylene having up to 6 carbon atoms, $R_1$ is hydrogen or lower alkyl, $R_3$ is hydrogen, and $R_2$ is a radical of formula (V). Where p is zero, $R_4$ is preferably $C_2$-$C_8$ alkenyl. Where p is one and q is zero, $R_6$ is preferably $C_2$-$C_6$ alkylene and $R_4$ is preferably $C_2$-$C_8$ alkenyl. Where both p and q are one, $R_5$ is preferably $C_2$-$C_6$ alkylene, phenylene, unsubstituted or lower alkyl-substituted cyclohexylene or cyclo hexylene-lower alkylene, unsubstituted or lower alkyl-substituted phenylene-lower alkylene, lower alkylene-phenylene, or phenylene-lower alkylene-phenylene, $R_6$ is preferably $C_2$-$C_6$ alkylene, and $R_4$ is preferably $C_2$-$C_8$ alkenyl.

Crosslinkable poly (vinyl alcohols comprising units of the formula I, I and II, I and III, or I and II and III can be prepared in a manner known per se. For example, U.S. Pat. Nos. 5,508,317, 5,583,163 and 6,303,687 disclose and teach how to prepare crosslinkable polymers comprising units of the formula I, I and II, I and III, or I and II and III.

A preferred crosslinkable polyurea prepolymer has formula (1)

wherein q is an integer of ≥3, Q is an organic radical that comprises at least one crosslinkable group, CP is a multivalent branched copolymer fragment comprising segments A and U and optionally segments B and T, Wherein: A is a bivalent radical of formula

wherein $A_1$ is the bivalent radical of —$(R_{11}$—O$)_n$—$(R_{12}$—O$)_m$—$(R_{13}$—O$)_p$—, a linear or branched $C_2$-$C_{24}$ aliphatic bivalent radical, a $C_5$-$C_{24}$ cycloaliphatic or aliphatic-cycloaliphatic bivalent radical, or a $C_6$-$C_{24}$ aromatic or aralphatic bivalent radical, $R_{11}$, $R_{12}$, $R_{13}$, independently of one other, are each linear or branched $C_2$-$C_4$-alkylene or hydroxy-substituted $C_2$-$C_8$ alkylene radical, n, m and p, independently of one another, are each a number from 0 to 100, provided that the sum of (n+m+p) is 5 to 1000, and $R_A$ and $R_A'$ independently of each other is hydrogen, an unsubstituted $C_1$-$C_6$alkyl, a substituted $C_1$-$C_6$alkyl, or a direct, ring-forming bond;

T is a bivalent radical of formula

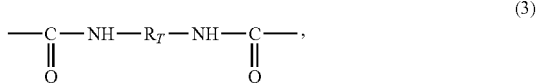

wherein $R_T$ is a bivalent aliphatic, cycloaliphatic, aliphatic-cycloaliphatic, aromatic, araliphatic or aliphatic-heterocyclic radical;

U is a trivalent radical of formula

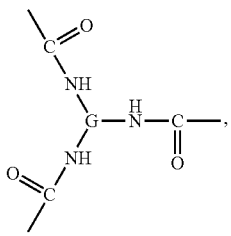

(4)

wherein G is a linear or branched $C_3$-$C_{24}$ aliphatic trivalent radical, a $C_5$-$C_{45}$ cycloaliphatic or aliphatic-cycloaliphatic trivalent radical, or a $C_3$-$C_{24}$ aromatic or araliphatic trivalent radical;

B is a radical of formula $$—NR_B—B_1—NR_B'—\qquad(5),$$

wherein $R_B$ and $R_B'$ independently of each other is hydrogen, an unsubstituted $C_1$-$C_6$alkyl, a substituted $C_1$-$C_6$alkyl, or a direct, ring-forming bond, $B_1$ is a bivalent aliphatic, cycloaliphatic, aliphatic-cycloaliphatic, aromatic or araliphatic hydrocarbon radical that is interrupted by at least one amine group —$NR_m$— in which $R_m$ is hydrogen, a radical Q mentioned above or a radical of formula $$Q\text{-}CP'—\qquad(6),$$

wherein Q is as defined above, and CP' is a bivalent copolymer fragment comprising at least two of the above-mentioned segments A, B, T and U; provided that in the copolymer fragments CP and CP' a segment A or B is followed by a segment T or U in each case; provided that in the copolymer fragments CP and CP' a segment T or U is followed by a segment A or B in each case; provided that the radical Q in formulae (1) and (6) is bonded to a segment A or B in each case; and provided that the N atom of —$NR_m$— is bonded to a segment T or U when $R_m$ is a radical of formula (6).

A crosslinkable prepolymer of formula (I) is obtained by introducing ethylenically unsaturated groups into an amine- or isocyanate-capped polyurea, which preferably is a copolymerization product of a mixture comprising (a) at least one poly(oxyalkylene)diamine, (b) at least one organic polyamine, (c) at least one diisocyanate, and (d) optionally at least one polyisocyanate. More preferably, the amine- or isocyanate-capped polyurea is a copolymerization product of a mixture comprising (a) at least one poly(oxyalkylene) diamine, (b) at least one organic di- or poly-amine (preferably triamine), (c) at least one diisocyanate.

Examples of preferred poly(oxyalkylene)diamine include so-called Jeffamines® having an average molecular weight of, for example, approximately from 200 to 5000.

Diisocyanate can be a linear or branched $C_3$-$C_{24}$ aliphatic diisocyanate, a $C_5$-$C_{24}$ cycloaliphatic or aliphatic-cycloaliphatic diisocyanate, or a $C_6$-$C_{24}$ aromatic or araliphatic diisocyanate. Examples of especially preferred diisocyanates are isophorone diisocyanate (IPDI), 4,4'-methylenebis (cyclohexyl isocyanate), toluoylene-2,4-diisocyanate (TDI), 1,6-diisocyanato-2,2,4-trimethyl-n-hexane (TMDI), methylenebis(cyclohexyl-4-isocyanate), methylenebis(phenyl-isocyanate) or hexamethylene-diisocyanate (HMDI).

An organic diamine can be a linear or branched $C_2$-$C_{24}$ aliphatic diamine, a $C_5$-$C_{24}$ cycloaliphatic or aliphatic-cycloaliphatic diamine, or a $C_6$-$C_{24}$ aromatic or araliphatic diamine. A preferred organic diamine is bis(hydroxyethylene)ethylenediamine (BHEEDA) or others.

Examples of preferred polyamines are symmetrical or asymmetrical dialkylenetriamines or trialkylenetetramines. Preferred polyamines include without limitation diethylenetriamine, N-2'-aminoethyl-1,3-propylenediamine, N,N-bis(3-aminopropyl)-amine, N,N-bis(6-aminohexyl)amine and triethylenetetramine.

A polyisocyanate can be a linear or branched $C_3$-$C_{24}$ aliphatic polyisocyanate, a $C_5$-$C_{45}$ cycloaliphatic or aliphatic-cycloaliphatic polyisocyanate, or a $C_6$-$C_{24}$ aromatic or araliphatic polyisocyanate. Preferably, a polyisocyanate is a $C_6$-$C_{45}$ cycloaliphatic or aliphatic-cycloaliphatic compound containing 3-6 isocyanate groups and at least one heteroatom selected from the group consisting of oxygen and nitrogen. More preferably, a polyisocyanate is a compound having a group of formula (7):

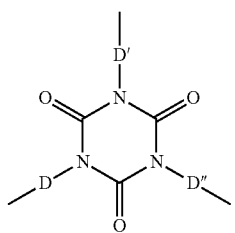

(7)

wherein D, D' and D" independent of one another are a linear or branched divalent $C_1$-$C_{12}$ alkyl radical, a divalent $C_5$-$C_{14}$ alkylcycloalkyl radical. Examples of preferred triisocyanates include without limitation the isocyanurate trimer of hexamethylene diisocyanate, 2,4,6-toluene triisocyanate, p, p', p"-triphenylmethane triisocyanate, and the trifunctional trimer (isocyanurate) of isophorone diisocyanate.

It is advantageous that the amine- or isocyanate-capped polyurea is an amine-capped polyurea which may allow the second step reaction to be carried out in an aqueous medium.

A crosslinkable polyurea prepolymer of the invention can be prepared in a manner known to person skilled in the art, for example in a two-step process. In the first step, an amine- or isocyanate-capped polyurea of the invention is prepared by reacting together a mixture comprising (a) at least one poly(oxyalkylene)diamine, (b) at least one organic di- or poly-amine, (c) at least one diisocyanate, and (d) at least one polyisocyanate. In the second step, a multifunctional compound having at least one ethylenically unsaturated group and a function group coreactive with the capping amine or isocyanate groups of the amine- or isocyanate-capped polyurea obtained in the first step.

The first step reaction is advantageously carried out in an aqueous or aqueous-organic medium or organic solvent (e.g. ethyllactate, THF, isopropanol, or the like). A suitable medium has been found to be especially a mixture of water and a readily water-soluble organic solvent, e.g. an alkanol, such as methanol, ethanol or isopropanol, a cyclic ether, such as tetrahydrofuran (THF), or a ketone, such as acetone. An especially suitable reaction medium is a mixture of water and a readily water-soluble solvent having a boiling point of from 50 to 85° C., preferably from 50 to 70° C., especially a water/tetrahydrofuran or a water/acetone mixture.

The reaction temperature in the first reaction step of the process is, for example, from −20 to 85° C., preferably from −10 to 50° C. and most preferably from −5 to 30° C.

The reaction times in the first reaction step of the process may vary within wide limits, a time of approximately from 1 to 10 hours, preferably from 2 to 8 hours and most preferably 2 to 3 hours having proved practicable.

It is understood that a microreactor system can be used to prepare a prepolymer of the invention. Where a microreactor system is used, the reaction time can be greatly shortened to minutes.

In accordance with a preferred embodiment of the invention, a lens-forming material is composed of primarily one or more prepolymers and optionally additional vinylic monomers. Crosslinking or polymerizing is preferably effected whilst solvent-free or essentially solvent-free or directly from an aqueous solution or a mixture of water and a water-miscible organic solvent. The prepolymer is preferably in a substantially pure form, for example, as obtained by a purification step, such as ultrafiltration. For example, cross linking or polymerizing may be undertaken from an aqueous solution containing about 15 to 90% of one or more prepolymers.

The vinylic monomer which may be additionally used for photo-crosslinking or polymerizing in accordance with the invention may be hydrophilic, hydrophobic or may be a mixture of a hydrophobic and a hydrophilic vinylic monomer. Suitable vinylic monomers include especially those normally used for the manufacture of contact lenses. A "hydrophilic vinylic monomer" refers to a monomer which as a homopolymer typically yields a polymer that is water-soluble or can absorb at least 10 percent by weight water. A "hydrophobic vinylic monomer" refers to a monomer which as a homopolymer typically yields a polymer that is insoluble in water and can absorb less than 10 percent by weight water.

It is preferable to use a hydrophobic vinylic monomer, or a mixture of a hydrophobic vinylic monomer with a hydrophilic vinylic monomer, whereby this mixture contains at least 50 percent by weight of a hydrophobic vinyl comonomer. In this way, the mechanical properties of the resultant polymer may be improved without the water content dropping substantially. Both conventional hydrophobic vinylic monomers and conventional hydrophilic vinylic monomers are suitable for copolymerization with the prepolymers.

Suitable hydrophobic vinylic monomers include, without limitation, C1-C18-alkylacrylates and -methacrylates, C3-C18 alkylacrylamides and -methacrylamides, acrylonitrile, methacrylonitrile, vinyl-C1-C18-alkanoates, C2-C18-alkenes, C2-C18-halo-alkenes, styrene, C1-C6-alkylstyrene, vinylalkylethers in which the alkyl moiety has 1 to 6 carbon atoms, C2-C10-perfluoralkyl-acrylates and -methacrylates or correspondingly partially fluorinated acrylates and methacrylates, C3-C12-perfluoralkyl-ethyl-thiocarbonylamino-ethyl-acrylates and -methacrylates, acryloxy and methacryloxy-alkylsiloxanes, N-vinylcarbazole, C1-C12-alkylesters of maleic acid, fumaric acid, itaconic acid, mesaconic acid and the like. Preference is given e.g. to C1-C4-alkylesters of vinylically unsaturated carboxylic acids with 3 to 5 carbon atoms or vinylesters of carboxylic acids with up to 5 carbon atoms.

Suitable hydrophilic vinylic monomers include, without limitation, hydroxy-substituted lower alkylacrylates and -methacrylates, acrylamide, methacrylamide, lower alkylacrylamides and -methacrylamides, ethoxylated acrylates and methacrylates, hydroxy-substituted lower alkyl-acrylamides and -methacrylamides, hydroxy-substituted lower alkylvinyl-ethers, sodium ethylene sulphonate, sodium styrene sulphonate, 2-acrylamido-2-methyl-propane-sulphonic acid, N-vinyl pyrrole, N-vinyl succinimide, N-vinyl pyrrolidone, 2- or 4-vinyl pyridine, acrylic acid, methacrylic acid, amino- (whereby the term "amino" also includes quaternary ammonium), mono-lower-alkylamino- or di-lower-alkylamino-lower-alkyl-acrylates and -methacrylates, allyl alcohol and the like. Preference is given e.g. to hydroxy-substituted C2-C4-alkyl (meth)acrylates, five- to seven-membered N-vinyl-lactams, N,N-di-C1-C4-alkyl-methacrylamides and vinylically unsaturated carboxylic acids with a total of 3 to 5 carbon atoms.

Preferred hydrophobic vinylic monomers are methyl methacrylate and vinyl acetate. Preferred hydrophilic vinylic comonomers are 2-hydroxyethyl methacrylate, N-vinyl pyrrolidone and acrylamide.

To facilitate the photocrosslinking and/or polymerizing process, it is desirable to add a photoinitiator, which can initiate radical crosslinking and/or polymerizing. Exemplary photoinitators suitable for the present invention include benzoin methyl ether, 1-hydroxycyclohexylphenyl ketone, DAROCUR® 1173 and IRGACURE® 2959 photoinitators. Preferably, up to about 0.15%, based on the total weight of the polymerizable formulation, of a photoinitiator is used.

In accordance with the invention, Butylated Polyvinylpyrrolidone is a commercial product and is available from various suppliers. A preferred Butylated Polyvinylpyrrolidone for the present invention is sold by International Specialty Products (ISP) under the tradenames Antaron P904 (in Europe) and Ganex P904 (in the US). The structure of Butylated Polyvinylpyrrolidone is shown below, wherein R is butyl group.

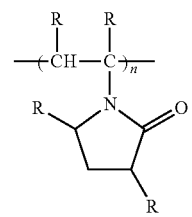

Since Butylated Polyvinylpyrrolidone is supplied in a powder form, it has to be dissolved in water prior to the addition of lens forming material. Since the lens forming materials of the present invention are water-based, the dissolution of Butylated Polyvinylpyrrolidone may be performed using the water present in the formulation followed by addition of the remaining components. Thus, in accordance with one embodiment of the present invention, Butylated Polyvinylpyrrolidone is dissolved in water, and to the solution an aqueous lens forming material is added. However, it is apparent to a person skilled in the art that other embodiments exist, for example, a lens forming material may first be mixed with water, followed by the addition of a water solution of Butylated Polyvinylpyrrolidone.

Where a lens-forming material is a water-soluble a water-soluble crosslinkable poly (vinyl alcohol) prepolymer is a polyhydroxyl compound comprising units of formula (I) or (III) as described, for example, from U.S. Pat. No. 5,508,317 and may be prepared according to the process described therein.

The further non-reactive PVA could be added to the solution of the crosslinkable PVA. The non-reactive PVA is a PVA which is devoid of polymerizable groups, and which has an average molecular weight $M_n$ being higher than that of the PVA prepolymer.

Non-reactive PVAs of all kinds, for example those with low, medium or high polyvinyl acetate contents may be employed. In addition, the PVAs used may also comprise small proportions, for example up to 20%, preferably up to 5%, of copolymer units as mentioned before. The use of non-reactive PVAs with vinyl acetate unit content of less than 20%, preferably lower than 2%, is preferred.

The number-average molecular weight Mn of the non-reactive PVA is, for example, higher by at least 10000, preferably by at least 20000, than that of the crosslinkable PVA. For example, in the preferred case of a PVA prepolymer having an average molecular weight Mn of from 12000 to 25000, the average molecular weight Mn of the non-reactive PVA is, for example, from 25000 to 100000, preferably from 30000 to 75000 and in particular from 35000 to 70000.

The non-reactive PVA group is present in the aqueous solution of the crosslinkable PVA in an amount of, for example, from 0.05 to 10% by weight, preferably from 0.1 to 5.0% by weight, more preferably from 0.25 to 3% by weight, and in particular from 0.4 to 1.0% by weight, each based on the entire weight of the aqueous solution.

In a preferred embodiment of the invention, a mixture of two or more different non-reactive PVAs is added to the solution of the crosslinkable PVA. The difference in average molecular weight $M_n$ between each of the non-reactive PVAs is, for example, at least 10000. For example, in a preferred embodiment of the invention, the PVA prepolymer has an average molecular weight $M_n$ of from 12000 to 25000, and two non-reactive PVAs, one having a lower average molecular weight $M_r$, of, for example, from 25000 to 50000, preferably from 30000 to 50000, and the other one having a higher average molecular weight $M_n$ of, for example, from above 50000 to 100000, preferably from above 50000 to 75000, are added.

In case of two or more different non-reactive PVAs, the total amount thereof in the aqueous solution of the prepolymer is as described before including the preferences given. The weight proportion of the lower molecular weight and higher molecular weight non-reactive PVA may vary within broad ranges, but is, for example, from 1:1 to 5:1, preferably from 1:1 to 4:1, and in particular from 1:1 to 3:1.

The non-reactive polyvinyl alcohols employed in the present invention are known and are commercially available, for example under the brand name Mowiol® from KSE (Kuraray Specialities Europe).

The Butylated Polyvinylpyrrolidone present in the fluid composition in an amount sufficient to form an intact interfacial film at a mold/composition interface with a thickness sufficient to reduce an averaged mold separation force by at least about 15%, preferably by at least about 20%, more preferably by at least about 25%, in comparison with that without the Butylated Polyvinylpyrrolidone (i.e., compared with the averaged mold separation force obtained when replacing the fluid composition with a control composition). The control composition comprises all components except the Butylated Polyvinylpyrrolidone (i.e., free of Butylated Polyvinylpyrrolidone).

In accordance with the invention, the averaged mold separation force is reduced to preferably about 35 N or less, more preferably about 30 N or less, even more preferably about 25 N or less.

The Butylated Polyvinylpyrrolidone can present in the fluid composition in an amount of up to 5% by weight, preferably up to 2.5% by weight, more preferably from 0.1% to 2.5% by weight, even more preferably from 0.2% to 1.5% by weight and in particular from 0.3% to 1% by weight, each based on the entire weight of the fluid composition.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, TOPAS® COC (cyclic olefin copolymer) grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

A person skilled in the art will know well how to actinically or thermally crosslink and/or polymerize (i.e., cure) the lens-forming material within the lens-forming cavity to form the contact lens.

In a preferred embodiment, where a fluid composition is a solution, solvent-free liquid, or melt of one or more prepolymers optionally in presence of other components, reusable molds are used and the lens-forming material is cured actinically under a spatial limitation of actinic radiation to form a contact lens. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

In this case, a fluid composition is put into a mold consisting of two mold halves, the two mold halves not touching each other but having a thin gap of annular design arranged between them. The gap is connected to the mold cavity, so that excess lens material can flow away into the gap. Instead of polypropylene molds that can be used only once, it is possible for reusable quartz, glass, sapphire molds to be used, since, following the production of a lens, these molds can be cleaned rapidly and effectively off the uncrosslinked prepolymer and other residues, using water or a suitable solvent, and can be dried with air. Reusable molds can also be made of TOPAS® COC (cyclic olefin copolymer) grade 8007-S10 (clear amorphous copolymer of ethylene and norbornene) from Ticona GmbH of Frankfurt, Germany and Summit, N.J. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced.

The two opposite surfaces (anterior surface and posterior surface) of a contact lens are defined by the two molding surfaces while the edge is defined by the spatial limitation of actinic irradiation rather than by means of mold walls. Typically, only the lens-forming material within a region bound by the two molding surfaces and the projection of the well defined peripheral boundary of the spatial limitation is crosslinked whereas any lens-forming material outside of and immediately around the peripheral boundary of the spatial limitation is not crosslinked, and thereby the edge of the contact lens should be smooth and precise duplication of the dimension and geometry of the spatial limitation of actinic radiation. Such method of making contact lenses are described in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

A spatial limitation of actinic radiation (or the spatial restriction of energy impingement) can be effected by masking for a mold that is at least partially impermeable to the particular form of energy used, as illustrated in U.S. patent application Ser. No. 08/274,942 filed Jul. 14, 1994 and U.S. Pat. No. 6,627,124 (herein incorporated by reference in their entireties) or by a mold that is highly permeable, at least at one side, to the energy form causing the crosslinking and that has mold parts being impermeable or of poor permeability to the energy, as illustrated in U.S. patent application Ser. No. 10/732,566 filed Dec. 10, 2003, Ser. No. 10/721,913 filed Nov. 25, 2003 and U.S. Pat. No. 6,627,124 (herein incorporated by reference in their entireties). The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

A mold can be opened according to any suitable methods known to a person skilled in the art. A mold is separated into a male mold half and a female mold half, with the molded lens adhered to one of the two mold halves. After opening the mold, the lens is dislodged (removed) from its adhering mold half and can be subjected to one or more of the following known processes, extraction, surface treatment (e.g., plasma coating, LbL coating, corona treatment, etc.), hydration, equilibration, packaging, and sterilization (e.g., autoclave).

A "surface treatment" is intended to describe a process in which a lens has been treated by means of contact with a vapor or liquid, and/or by means of application of an energy source and as such, (1) a coating is applied to the surface of the lens, (2) chemical species are adsorbed onto the surface of the lens, (3) the chemical nature (e.g., electrostatic charge) of chemical groups on the surface of the lens are altered, or (4) the surface properties of the are otherwise modified. Exemplary surface treatment processes include, but are not limited to, a surface treatment by energy (e.g., a plasma, a static electrical charge, irradiation, or other energy source), chemical treatments, the grafting of hydrophilic monomers or macromers onto the surface of an article, and layer-by-layer (LbL coating) deposition of polyelectrolytes. A preferred class of surface treatment processes are plasma processes, in which an ionized gas is applied to the surface of an article. Plasma gases and processing conditions are described more fully in U.S. Pat. Nos. 4,312,575 and 4,632,844, which are incorporated herein by reference. The plasma gas is preferably a mixture of lower alkanes and nitrogen, oxygen or an inert gas.

"LbL coating", as used herein, refers to a coating that is not covalently attached to an article, preferably a medical device, and is obtained through a layer-by-layer ("LbL") deposition of polyionic (or charged) and/or non-charged materials on an article. An LbL coating can be composed of one or more layers, preferably one or more bilayers.

The term "bilayer" is employed herein in a broad sense and is intended to encompass: a coating structure formed on a medical device by alternatively applying, in no particular order, one layer of a first polyionic material (or charged material) and subsequently one layer of a second polyionic material (or charged material) having charges opposite of the charges of the first polyionic material (or the charged material); or a coating structure formed on a medical device by alternatively applying, in no particular order, one layer of a first charged polymeric material and one layer of a non-charged polymeric material or a second charged polymeric material. It should be understood that the layers of the first and second coating materials (described above) may be intertwined with each other in the bilayer.

Formation of an LbL coating on a medical device, in particular, an ophthalmic device, may be accomplished in a number of ways, for example, as described in commonly-owned U.S. Pat. No. 6,451,871 (herein incorporated by reference in its entirety) and commonly-owned pending U.S. patent applications (application Ser. Nos. 09/774,942, 09/775,104, 10/654,566), herein incorporated by reference in their entireties. One coating process embodiment involves solely dip-coating and dip-rinsing steps. Another coating process embodiment involves solely spray-coating and spray-rinsing steps. However, a number of alternatives involve various combinations of spray- and dip-coating and rinsing steps may be designed by a person having ordinary skill in the art.

In accordance with the present invention, the Butylated Polyvinylpyrrolidone is present in an amount sufficient to provide an averaged mold separation force of about 40 N or less, thereby leading to an increased production yield and an improved lens quality. When averaged mold separation force is about 30 N or lower, defects such as cracks, flaws and/or tears occurred during mold opening can be minimized.

The present invention, in another aspect, provides a fluid composition for making contact lenses according to a molding process in which the edge of each contact lens is defined by a spatial limitation of actinic irradiation. The fluid composition comprises: a lens-forming material and a Butylated Polyvinylpyrrolidone, wherein the lens-forming material is crosslinkable and/or polymerizable by a spatial limitation of actinic radiation in a mold having two molding surfaces to form a contact lens having a first surface, an opposite second surface, and an edge, wherein the first and second surface are defined by the two molding surface, and the edge is defined by the spatial limitation of actinic radiation, wherein the Butylated Polyvinylpyrrolidone is present in an amount sufficient to provide an averaged mold separation force of about 40 N or less, thereby leading to an increased production yield and an improved lens quality.

Preferred examples of prepolymers, non-crosslinkable hydrophilic polymers, monomers, fluid compositions, molds, and the amounts of the Butylated Polyvinylpyrrolidone are those described above.

The previous disclosure will enable one having ordinary skill in the art to practice the invention. In order to better enable the reader to understand specific embodiments and is the advantages thereof, reference to the following examples is suggested. In the Examples which follow, amounts are by weight, unless specified otherwise, and temperatures are given in degrees Celsius.

Example 1

40 g (1.0 mol) of sodium hydroxide are dissolved in 100 g of water and 200 g of ice in a 1-liter reactor having a stirrer and a cooling system. The sodium hydroxide solution is cooled to 10.degree. C., and 105.1 g (1.0 mol) of aminoacetaldehyde dimethylacetal and 10 mg of the inhibitor 4-hydroxy-2,2,6,6-tetramethylpiperidin-1-oxide are added. 99.5 g (1.1 mol) of acrylic acid chloride are slowly added to that solution at 10.degree. C. over a period of 2 hours. The pH value drops slowly and ultimately is adjusted to 7. According to GC, amine is no longer present. The reaction mixture is saturated with sodium chloride and extracted three times with 200 ml of tert-butyl methyl ether. The organic phase is dried, filtered and concentrated using a rotary evaporator. The resulting oil is extracted three times with petroleum ether and then dried again using a rotary evaporator. 130 g of acrylamidoacetaldehyde dimethylacetal (81% of theory) are obtained in the form of oil; the product is 99% according to GC.

Example 2

This Example illustrates a general method for the preparation of a PVA prepolymer having low acetate content.

300 g of PVA (for example Moviol Hoechst 4-88) are placed in a 2-liter double-jacket reactor having a stirrer and thermometer, 800 g of deionised water are added and the mixture is heated to 95.degree. C. with stirring. After one hour, everything has dissolved to produce a clear solution which is cooled to 20.degree. C. 27 g (0.155 mol) of methacrylamidoacetaldehyde dimethyl acetal (synthesis see EP-A-0,641,806, Example 11), 200 g of concentrated hydrochloric acid (37%) and sufficient deionised water (in this specific case: 673 g) are added to produce a total of 2000 g of reaction solution. The mixture is stirred at 20.degree. C. After 20 hours, a sample of the reaction solution is titrated with sodium hydroxide and the degree of hydrolysis of the PVA is ascertained: HCl=1.034 meq/g, acetic acid=0.265 meq/g corresponding to 3.5 mol % residual acetate. The reaction mixture is stirred for a further 2 hours at 25.degree. C. and titrated again. HCl=1.034 meq/g, acetic acid=0.277 meq/g, corresponding to 2.93 mol % residual acetate.

The isolation can be carried out by means of ultrafiltration: the reaction mixture is cooled to 15.degree. C. and adjusted to pH 7 with aqueous NaOH (5%). The polymer solution is filtered by way of a 0.45 µm filter and purified by means of ultrafiltration. The ultrafiltration is carried out using a 1-KD-Omega membrane produced by Filtron. Ultrafiltration is carried out to a residual sodium chloride content of 0.002%. 1800 g of a 14.02% polymer solution (86% of theory) are obtained; N-content (Kjeldahl determination)= 0.741%, acetate content (after titration)=0.605 meq/g corresponding to 2.91 mol %, inherent viscosity: 0.327, double bonds: 0.61 meq/g (ascertained by microhydrogenation), free hydroxy groups (ascertained by reacetylation): 18.13 meq/g, GPC analysis (in water): Mw=22 007, Mn=9 743, Mw/Mn=2.26.

The isolation can also be carried out by means of precipitation: the reaction mixture is adjusted to pH 3.6 with triethylamine and precipitated in acetone in a ratio of 1:10. The precipitate is separated off, dispersed twice with ethanol and once with acetone, and dried. The product so obtained is comparable with that obtained by ultrafiltration.

Preparation of a Lens Formulation

Example 3 lens formulation is prepared to contain 30.6% by weight of PVA prepolymer of example 2, 0.1% of Irgacure 2959 by weight, and CuP in an amount to provide the formulation a transmittance of 98%, water is added to make up the remaining percentage.

Example 4 lens formulation is prepared to contain 30.6% by weight of PVA prepolymer of example 2, 0.1% of Irgacure 2959 by weight, 0.3% of poloxamer 108 (Pluronics® F38), and CuP in an amount to provide the formulation a transmittance of 98%, water is added to make up the remaining percentage.

Example 5 lens formulation is prepared to contain 30.6% by weight of PVA prepolymer of example 2, 0.1% of Irgacure 2959, 0.5% of Butylated Polyvinylpyrrolidone (Ganex P-904LC), and CuP in an amount to provide the formulation a transmittance of 98%, water is added to make up the remaining percentage.

Lens Production

Formulations prepared in above are dispensed onto a female mold half by using an EFD automatic dispenser (4 bar, 1.2 sec). The female mold half is then mated with a corresponding male mold half. The mold is closed by using a pneumatic closing system. The formulation is UV cured under 2 different UV lights (1.8 mW/cm.sup.2 each) for total exposure time of 4.9 sec.

Mold Separation Force Measurement

Mold separation force is measured using ZWICK® brand tensile test machine (ZWICK® Z 2.5) and a mold assembly which is disclosed in detail in U.S. Pat. No. 6,203,909 B1 (herein incorporated by reference in its entirety). The female mold half of the mold assembly is mounted rigidly onto the bottom of the machine, the male mold half is attached to the machine with a cardanic suspension device to enable force-free alignment. Mold separation forces (MSF) are determined for each formulation. Reduction in MSF (compared to control) is equal to $(MSF_{control} - MSF)/MSF_{control}$. The control is the example 3, among examples 3, 4 and 5. The test results are provided in Table 1.

TABLE 1

| | MSF Avg (N) | MSF STD(N) | Reduction in MSF (%) |
|---|---|---|---|
| Example 3: Control w/o Mold Releasing Agent(n = 10) | 118.4 | 92.7 | |

TABLE 1-continued

| | MSF Avg (N) | MSF STD(N) | Reduction in MSF (%) |
|---|---|---|---|
| Example 4 w/0.3% poloxamer (n = 10) | 46.4 | 9.8 | 61% |
| Example 5 w/0.5% Butylated Polyvinylpyrrolidone (n = 10) | 33.6 | 6.9 | 72% |

Example 6 lens formulation is prepared to contain 30.6% by weight of PVA prepolymer of example 2, 1.5% of Mowiol 6-98, and 0.5% of Mowiol 10-98 (by weight measured as percentage of total macromer solid), and CuP in an amount to provide the formulation a transmittance of 98%, water is added to make up the remaining percentage.

Example 7-10 lens formulations are prepared the same as example 6 except that 0.3% poloxamer, 0.3% Butylated Polyvinylpyrrolidone, 0.5% Butylated Polyvinylpyrrolidone and 1% Butylated Polyvinylpyrrolidone is added, respectively.

Lens Production

Formulations prepared in above are dispensed onto a female mold half by using an EFD automatic dispenser (4 bar, 1.2 sec). The female mold half is then mated with a corresponding male mold half. The mold is closed by using a pneumatic closing system. The formulation is UV cured under 2 different UV lights (1.8 mW/cm.sup.2 each) for total exposure time of 4.9 sec.

Mold Separation Force Measurement

Mold separation force is measured using ZWICK® brand tensile test machine (ZWICK® Z 2.5) and a mold assembly which is disclosed in detail in U.S. Pat. No. 6,203,909 B1 (herein incorporated by reference in its entirety). The female mold half of the mold assembly is mounted rigidly onto the bottom of the machine, the male mold half is attached to the machine with a cardanic suspension device to enable force-free alignment. Mold separation forces (MSF) are determined for each formulation. Reduction in MSF (compared to control) is equal to $(MSF_{control} - MSF)/MSF_{control}$. The control is the example 6, among examples 6, 7, 8, 9 and 10. The test results are provided in Table 2.

TABLE 2

| | MSF Avg (N) | MSF STD(N) | Reduction in MSF (%) |
|---|---|---|---|
| Example 6 Control (n = 10) | 40.8 | 14.5 | — |
| Example 7 Control w/0.3% poloxamer (n = 10) | 20.3 | 6.9 | 50% |
| Example 8 Control w/0.3% Butylated Polyvinylpyrrolidone (n = 10) | 29.8 | 8.2 | 27% |
| Example 9 Control w/0.5% Butylated Polyvinylpyrrolidone (n = 10) | 29.4 | 9.3 | 28% |
| Example 10 control w/1% Butylated Polyvinylpyrrolidone (n = 10) | 26.8 | 9.2 | 34% |

Table 2 shows that averaged mold separation forces, standard deviations, the maximum and minimum mold separation forces, and reduction in averaged mold separation force.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A method for producing a contact lens, comprising: the steps of: introducing a fluid composition into a mold for making a contact lens, wherein the fluid composition comprises a lens-forming material and a Butylated Polyvinylpyrrolidone, wherein the lens-forming material is a water-soluble crosslinkable poly(vinyl alcohol) prepolymer which is crosslinkable and/or polymerizable by actinic radiation or by heating;

crosslinking/polymerizing the lens-forming material in the mold to form a lens having a polymer matrix; and separating the mold, wherein the Butylated Polyvinylpyrrolidone present in an amount sufficient to reduce an averaged mold separation force by at least about 20% in comparison with that without the Butylated Polyvinylpyrrolidone;

wherein the Butylated Polyvinylpyrrolidone having a molecular weight of about 12,000 Da to 22,000 Da.

2. The method of claim 1, wherein the water-soluble crosslinkable poly(vinyl alcohol) prepolymer is a polyhydroxyl compound which has a molecular weight of at least about 2000 and comprises from about 0.5 to about 80%, based on the number of hydroxyl groups in the poly(vinyl alcohol), of units of the formula I, I and II, I and III, or I and II and III

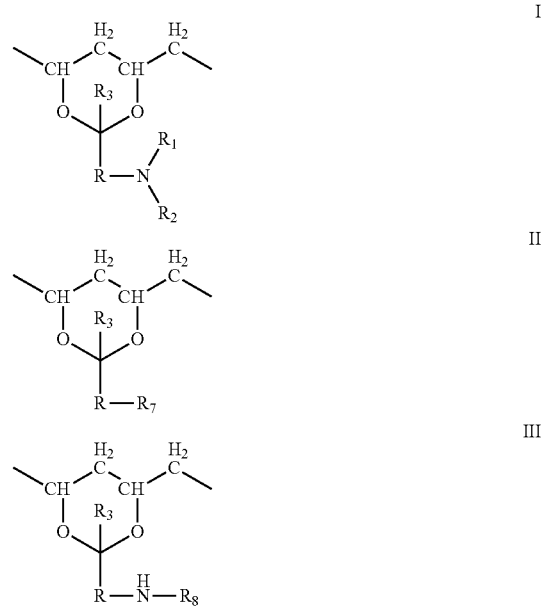

wherein R is alkylene having up to 12 carbon atoms; $R_1$ is hydrogen or lower alkyl having up to seven carbon atoms; $R_2$ is an olefinically unsaturated, electron-withdrawing, crosslinkable radical having up to 25 carbon atoms; $R_3$ is hydrogen, a $C_1$-$C_6$ alkyl group or a cycloalkyl group; $R_7$ is a primary, secondary or tertiary amino group or a quaternary amino group of the formula $N^+(R')_3X^-$, in which each R', independently of the others, is hydrogen or a $C_1$-$C_4$ alkyl radical and X is a counterion selected from the group consisting of $HSO_4^-$, $F^-$, $Cl^-$, $Br^-$, $I^-$, $CH_3COO^-$, $OH^-$, $BF^-$, and $H_2PO_4^-$; and $R_8$ is the radical of a monobasic, dibasic or tribasic, saturated or unsaturated, aliphatic or aromatic organic acid or sulfonic acid.

3. The method of claim 1, wherein the step of crosslinking and/or polymerizing is performed under a spatial limitation of actinic radiation to form a contact lens having a first surface, an opposite second surface, and an edge, wherein the mold is a reusable mold having two molding surfaces, wherein the first and second surfaces are defined by the two molding surface, and the edge is defined by the spatial limitation of actinic radiation.

4. A method for improving quality and production yield of contact lenses, comprising the steps of: adding a Butylated Polyvinylpyrrolidone into a fluid composition including a water-soluble crosslinkable poly(vinyl alcohol) prepolymer lens-forming material in an amount sufficient to reduce an averaged mold separation force by at least about 20% in comparison with that without the Butylated Polyvinylpyrrolidone, wherein the lens-forming material is crosslinkable and/or polymerizable by actinic radiation or by heating in a mold to form a contact lens having a polymer matrix.

5. A fluid composition for making contact lenses, comprising: a water-soluble crosslinkable poly(vinyl alcohol) prepolymer lens-forming material and a Butylated Polyvinylpyrrolidone, wherein the lens-forming material is crosslinkable and/or polymerizable by actinic radiation in a mold to form a contact lens having a polymer matrix, wherein the Butylated Polyvinylpyrrolidone is present in an amount sufficient to reduce an averaged mold separation force by at least about 20% in comparison with that without the Butylated Polyvinylpyrrolidone.

* * * * *